United States Patent [19]

Vessey et al.

[11] 4,029,513

[45] June 14, 1977

[54] SURFACE TREATED SILICA

[75] Inventors: Eric W. Vessey, Springfield, Pa.; James R. Miller, Rancho La Costa, Calif.; Klaus Robert Lange, Huntingdon Valley, Pa.

[73] Assignee: Philadephia Quartz Company, Valley Forge, Pa.

[22] Filed: June 11, 1975

[21] Appl. No.: 585,910

Related U.S. Application Data

[63] Continuation-in-part of Ser. No. 376,269, July 3, 1973, abandoned.

[52] U.S. Cl. .............................. 106/288 B; 423/339; 423/335; 106/308 B; 428/403; 428/404
[51] Int. Cl.² .......................................... C09C 1/28
[58] Field of Search ................... 106/288 B, 308 B; 423/339, 335; 252/317; 428/403, 404

[56] References Cited

UNITED STATES PATENTS

| | | | |
|---|---|---|---|
| 3,010,791 | 11/1961 | Allen | 423/339 |
| 3,208,823 | 9/1965 | Baker et al. | 423/339 |

*Primary Examiner*—Winston A. Douglas
*Assistant Examiner*—J. V. Howard
*Attorney, Agent, or Firm*—Fred Philpitt; Ernest Posner

[57] ABSTRACT

Microfine silicas that are useful as rubber reinforcing fillers and thickening agents, and are readily dispersible are prepared by modifying the surface layer of the silica. The surface modification results from including in or affixing to the surface of the silica certain inorganic polyvalent ions.

11 Claims, No Drawings

SURFACE TREATED SILICA

This application is a continuation-in-part of co-pending U.S. Application Ser. No. 376,269 filed July 3, 1973, now abandoned.

BACKGROUND

This invention relates to microfine silica and a method of precipitating it. It relates further to hydrophobic microfine silica modified by inclusion of polyvalent ions on the surface of the silica.

The preparation of finely divided or microfine silica, 10 to 1000 mu, is well known and numerous patents have issued describing such processes. An example of such a patent is U.S. Pat. No. 3,208,823, hereby incorporated by reference. This patent describes methods of preparing finely divided hydrated silica by forming a protocoacervate from a soluble silicate solution using coacervating agents such as highly soluble salts, especially univalent inorganic salts; completely water miscible hydrogen bonding agents as, for example, simple alcohols and ketones, and highly soluble nitrogen bases such as ammonia and amines. The silica prepared by this and other precipitation methods using a coacervation step, always involves a secondary, highly alkaline phase some of which will be in the surface of the coacervated micelles and can be formed into gel when the micelles are precipitated as silica. This gel structure prevents the use of such precipitated silica in certain applications.

SUMMARY OF THE INVENTION

We have developed a method for preparing microfine silica that minimizes the possibility of forming undesirable gel on the silica surface and results in a surface modified with polyvalent inorganic ions. The method involves the protocoacervation of a silicate solution using a salt of a polyvalent anion. The micelles so formed are precipitated by the addition of further salt and the acid of a polyvalent anion. The precipitation is carried out slowly so that the micelles separate without gelation. The silicate is filtered, washed, boiled and acidified before drying. The resulting microfine silica is more dispersible, excellent for rubber reinforcing and useful as a thickening agent for various materials such as mineral oils, polyester resins and dibutylphthalates.

THE INVENTION

Alkali metal silicate solutions are used in the process of this invention to prepare microfine silica. Either sodium or potassium silicates can be used but sodium silicates are preferred for reasons of economy. Silicates of 1.8 to 4.0 $SiO_2/Na_2O$ wt ratio are useful in this process but we prefer to use silicates with ratios of about 3 $SiO_2/1\ Na_2O$ or more to facilitate removal of the alkali ion during the washing step. It is necessary to prepare dilute silicate solutions for use in the process of our invention. The silicate solutions should be diluted to the point that silica does not precipitate when the salt used in the protocoacervation step is added to the silicate. We have found that silicates that contain 0.01 to 0.5 g of $Na_2O$/cc and 0.02 to 0.19g of $SiO_2$/cc are useful in our process.

The salts required for our process include those of polyvalent anions that are readily soluble. In general these are sodium, potassium and ammonium salts of sulfates, sulfites, phosphates, and borates. Examples of such salts include sodium sulfate, potassium sulfate, sodium sulfite, potassium sulfite, sodium trimetaphosphate, sodium tripolyphosphate, sodium hexametaphosphate, sodium metaborate, ammonium metaborate, sodium pentaborate and ammonium pentaborate.

The readily soluble salt is added with agitation to the dilute silicate solution at a temperature between room temperature and the boiling point of the solution, in such an amount as to provide 0.5 to 1.5 equivalents of the salt per each equivalent of $Na_2O$. We prefer to heat the silicate solution to 80° to 98° C. The addition of the salt can be very quick with addition times of about 1 minute or it can be prolonged up to a number of hours. In any case the addition of the salt is complete when the reaction mixture is subjected to a heating step of ½ to 4 hours also at 80° to 98° C while agitating.

After the heating step the silica is then precipitated by adding a solution consisting of an acid saturated with a polyvalent salt. The acids used include those of the polyvalent anions discussed hereinbefore and are sulfuric, sulfurous, phosphoric and boric acids. The acids are used in concentrations of 0.75 to 1.25 normal and sufficient of the polyvalent salt is added to completely saturate the solution. The salts used with the acid are the same as those used in the protocoacervation step plus acid salts such as $NaH_2PO_4$. The acid-salt solution is added slowly until a pH between about 8 and 9.5 is reached. The time required for this slow partial neutralization step varies between 45 and 120 minutes. The slurry of precipitated silica is filtered, washed, reslurried, adjusted to a pH of about 9 and then boiled for a further 45 to 120 minutes.

The precipitated silica is filtered, reslurried and acidified. In general, this acidification is carried out with sulfuric acid and the pH is below 3, usually about 2. The acid slurry is now neutralized to a pH of 6 to 7 with ammonia. This slurry is now filtered, washed and reslurried. At this point the washed slurry may be spray dried or filtered and dried in some other manner.

The process hereinbefore described yields products of certain advantage over other precipitated product even those made by a protocoacervation technique. While the applicants do not wish to be restricted by any particular theory the following explanation of the difference between the processes and products appears to have merit. In the precipitation of microfine hydrated silica, using a coacervation step, there is a secondary, highly alkaline phase some of which is in the surface of the coacervated micelles and can cause gel formation when the micelles are precipitated as silica by the addition of acid. The present process minimizes the possibility of forming this undesirable gel on the silica surface. For instance, in a precipitation with sodium sulfate, there are sulfate ions on the silica surface at the time of separation and since additional sodium sulfate is added with the neutralizing acid solution so that there is no disturbance of the protocoacervate by dilution when the acid is added. The slow reduction of the pH to about 9 allows the micelles to separate, without gelation, from the highly alkaline phase. The alkaline phase is separated from the silica by filtration and any residual solution is washed away before boiling and reducing the pH to a low value.

The products of the process are finely divided silicas with polyvalent ions in or on the surfaces. The ultimate particle size can be 20 to 800 mu, a loss on ignition of 5 to 10%, surface area of 25 to 600 $m^2/g$ and a pore volume of 0.02 to 0.4 cc/g. The pH of a slurry containing about 5% of the silica has a pH of 6.5 to 10.

EXAMPLES

The following examples illustrate certain embodiments of the present invention and should not be considered as restricting the invention to said embodiments.

EXAMPLE 1

A sodium silicate with a $SiO_2/Na_2O$ ratio of 3.22/1.0 and 8.9% $Na_2O$ was diluted to 0.02g of $Na_2O/cc$ and heated to 95° C. Sodium trimetaphosphate was added over a period of 1 minute. Sufficient STMP was added to provide 1.1 equivalents per equivalent of $Na_2O$. The silica was precipitated by adding 1N $H_3PO_4$ saturated with $NaH_2PO_4$ with stirring until the pH reached 9.0. The precipitate was boiled for an hour, filtered, washed, reslurried with water and the pH reduced to 2 with sulfuric acid. The pH was then raised to 6 with ammonia, the silica was then filtered, washed, reslurried in water and spray dried at 190° to 220° C outlet temperature. The product had a pH of 6, loss on ignition of 7.7% and surface area of 350 $m^2/g$.

EXAMPLE 2

A sodium silicate with a $SiO_2/Na_2O$ weight ratio of 3.22/1.0 and 8.9% $Na_2O$ was diluted to 0.0197 gram of $Na_2O$ per cc. Then 18.6 gallons (70.4 liters) of the dilute silicate were treated with 7 pounds 14 ounces (3.57 kilograms) of sodium sulfate which dissolved at room temperature. This mixture was agitated with a "Lightnin" mixer and slowly acidified with 1N $H_2SO_4$ containing 32.6 pounds (14.7 kgs) of Na2SO4 per 20 gallons (75.7 liters) of acid. The acid was added at a flow rate of about 280 cc per minute and a pH of 8 was reached in 90 minutes. The slurry was filtered, rinsed with water, and reslurried. This slurry with a pH of 9 was boiled at atmospheric pressure for 1 hour, acidified to pH of 2 with $H_2SO_4$ while hot and returned to pH 7 with $NH_4OH$ and then was filtered and washed thoroughly. The precipitate was reslurried and spray dried at an inlet air temperature of 900° C, and an outlet temperature of 220° C. This sulfate-ion coated silica had a pH of 5.9, a loss at 110° C of 2.7%, a surface area of 277 $m^2/g$ and an ultimate particle size of 10 mu, a void volume of 5.9 cc/g, a pore volume of 0.22 cc/g. The following good thickening was obtained at 1 rpm.

| Fluid | % $SiO_2$ | Viscosity (cps) | Dispersion Means |
|---|---|---|---|
| Mineral Oil | 2.5 | 6600 | Milled |
| Polyester | 1.5 | 8200 | Stirred |
| Dibutylphthalate | 3.0 | 1500 | Blended |

The silicas prepared according to this example of Example 1 have surface characteristics which result in more dispersible microfine silica than silicas prepared using salts with ions of lower charge than phosphate. The phosphate coated silicas are excellent reinforcing fillers for rubber.

EXAMPLE 3

A protocoacervate was prepared by adding 31 pounds 7 ounces (14.25 kg) of $Na_2SO_4$ to 18.6 gallons (70.4 liters) of 3.22 $SiO_2/Na_2O$ weight ratio silicate diluted to 0.02 g of $Na_2O/cc$. Silica was precipitated by stirring in 1N $H_3PO_4$ saturated with $NaH_2PO_4$ at a rate of 280 cc/min. The pH reached 9.0 in 81 minutes. The slurry was then boiled for an hour, filtered, washed, slurried and acidified to a pH of 2 with sulfuric acid. The pH was then adjusted to a pH of 6 with ammonia before filtering, washing, and reslurrying in deionized water. The slurry was spray dried at 190° to 220° C outlet temperature. The product had a pH of 5.9, loss on ignition of 7.6%.

EXAMPLE 4

Microfine silica coated with boric acid will provide superior heat stability in silicone rubber and is especially useful in fusible tape silicone rubber formulations. It was found that coating by spray drying solutions of boric acid on microfine silica hydrate is only partly successful, because during spray drying large amounts of boric acid are lost. The boric acid is very volatile with steam and sublimes rather easily.

Also coating of mirofine silica with boron halide is not commercially feasible at this time because of the obnoxious character of the acid which is formed in large quantities.

The coating of microfine silica by reaction with boric acid esters such as trimethylborate is easily and simply carried out by slowly adding the ester to the strongly agitated hydrated fine silica in a closed system with the exclusion of atmospheric moisture. The reaction is slightly exothermic and may be carried out with ordinary hydrated microfine silica or with such silica which has been heated to 105° C to remove free water. Methanol formed as the by-product of the interaction of the trimethylborate with water and the OH groups of the silica is easily distilled off at room temperature in a vacuum of 0.2–1 of Hg.

Extraction of such borate coated microfine silica products with anhydrous methanol and water shows that the boric acid is bound to the microfine silica but the bond is not hydrolytically stable. This is to be expected since the Si—O—B linkage is known to be hydrolytically unstable. It was found by determination of the surface area under different pretreatment conditions, that the borate coating covered large areas of the microfine silica but did not change the actual surface area more than about 10%.

When the microfine silica used in Example 1 was coated using methylborate as described above, the products having the properties shown in Table I were obtained.

TABLE I

| | Borate-Coated Micro Fine Silica | | | | |
|---|---|---|---|---|---|
| Reaction Conditions | Amount of Boric Acid Equiv. Added | $SiO_2$ % | $H_3BO_3$ % | % of $H_3BO_3$ Extracted by Methanol | Surface Area, $m^2/g$ |
| Unmodified micro fine Silica treated at room temp. with $(MeO)_3B$ | 100% of ignition loss | 88.79 | 9.79 | 22.5 | 32[a] |
| Unmodified micro fine | 50% of ignition | 89.10 | 5.53 | 23.6 | 195[b] |

TABLE I-continued
Borate-Coated Micro Fine Silica

| Reaction Conditions | Amount of Boric Acid Equiv. Added | $SiO_2$ % | $H_3BO_3$ % | % of $H_3BO_3$ Extracted by Methanol | Surface Area, $m^2/g$ |
|---|---|---|---|---|---|
| silica, room temp. treated with $(MeO)_3B$ | loss | | | | |
| Micro fine silica dried at 105° C. and treated at room temp. with $(MeO)_3B$ | 100% of ignition loss | 90.84 | 10.13 | 17.0 | 20 |

*pretreated at 110° C. at atmospheric pressure
ᵇpretreated at 250° C. at atmospheric pressure

We claim:

1. A process for preparing microfine hydrated precipitated silica with a surface layer containing polyvalent inorganic ions by protocoacervate without residual gel formation, comprising:
   a. forming a protocoacervate solution by saturating a dilute sodium silicate solution with a salt of a polyvalent inorganic ion;
   b. neutralizing said protocoacervate solution to a pH of 8 to 9.5 by the slow addition of an acid of a polyvalent anion saturated with the salt of a polyvalent inorganic ion, thereby precipitating silica;
   c. filtering, washing and reslurrying the precipitated silica;
   d. adjusting the pH of the reslurried silica to about 9;
   e. boiling the reslurried silica;
   f. acidifying the slurry to a pH below about 3;
   g. raising the pH of the slurry to between 6 and 7 with ammonia;
   h. filtering, washing and reslurrying the precipitated silica; and
   i. drying said slurry to obtain the product.

2. The process of claim 1 wherein said dilute sodium silicate solution has a weight ratio of $SiO_2/Na_2O$ between 1.8 and 4.0/1.0 and contains 0.01 to 0.05 g of $Na_2O/cc$.

3. The process of claim 1 wherein the polyvalent inorganic ion is selected from the group consisting of sulfates, phosphates and borates.

4. The process of claim 1 wherein the salt of a polyvalent inorganic ion is selected from the group consisting of sodium sulfate, potassium sulfate, sodium sulfite, potassium sulfite, sodium tripolyphosphate, sodium hexametaphosphate, sodium metaborate, ammonium metaborate, sodium pentaborate and ammonium pentaborate.

5. The process of claim 1 wherein the sodium silicate solution is heated to a temperature between room temperature and the boiling point of the solution during formation of the protocoacervate.

6. The process of claim 5 wherein the temperature is 80° to 98° C.

7. The process of claim 1 wherein the acid selected from the group consisting of sulfuric, sulfurous, phosphoric and boric acids and the concentration of said acid is 0.75 to 1.25 normal.

8. The process of claim 1 wherein said neutralization step is carried out in 45 to 120 minutes.

9. The process of claim 1 wherein the boiling of the reslurried silica is continued for a period of 45 to 120 minutes.

10. The process of claim 1 wherein the product is obtained by spray drying.

11. A process of forming a microfine hydrated precipitated silica with a surface layer containing polyvalent inorganic ions by protocoacervation without residual gel formation in which:
   a. a protocoacervate solution is formed by saturating a dilute sodium silicate with sodium sulfate;
   b. the protocoacervate is neutralized to a pH of about 8 by the slow addition of a sulfuric acid solution containing sodium sulfate in excess of saturation;
   c. the slurry is filtered, rinsed with water and reslurried;
   d. the reslurried precipitate is boiled at about pH 9;
   e. acidified to a pH about 2 with sulfuric acid and then raised to pH about neutral with ammonia solution;
   f. the slurry is again filtered, washed, reslurried; and
   g. separated and dried.

* * * * *